(12) United States Patent
Tsukinowa

(10) Patent No.: US 7,110,145 B2
(45) Date of Patent: Sep. 19, 2006

(54) SCANNING UNIT OF IMAGE-RECORDING APPARATUS

(75) Inventor: Kazuumi Tsukinowa, Sayama (JP)

(73) Assignee: Konica Corporation, Tokyo (JP)

( * ) Notice: Subject to any disclaimer, the term of this patent is extended or adjusted under 35 U.S.C. 154(b) by 894 days.

(21) Appl. No.: 10/125,311

(22) Filed: Apr. 18, 2002

(65) Prior Publication Data

US 2002/0159104 A1 Oct. 31, 2002

(30) Foreign Application Priority Data

Apr. 26, 2001 (JP) ............................. 2001-129281

(51) Int. Cl.
*H04N 1/04* (2006.01)

(52) U.S. Cl. ...................... 358/374; 358/497; 358/496; 358/498; 399/374

(58) Field of Classification Search ................ 358/474, 358/498, 497, 496, 506, 505; 399/374, 39, 399/178
See application file for complete search history.

(56) References Cited

U.S. PATENT DOCUMENTS

| 5,559,585 | A | * | 9/1996 | Takagi | ......................... 399/178 |
| 5,774,760 | A | * | 6/1998 | Nagashima | ................... 399/39 |
| 6,640,082 | B1 | * | 10/2003 | Mitomi | ....................... 399/374 |
| 6,801,344 | B1 | * | 10/2004 | Morinaga et al. | ............ 358/474 |

* cited by examiner

*Primary Examiner*—Douglas Q. Tran
*Assistant Examiner*—Negussie Worku
(74) *Attorney, Agent, or Firm*—Lucas & Mercanti, LLP

(57) ABSTRACT

The invention concerns image-recording apparatus, which records an image onto a sheet-film. The image-recording apparatus includes a mainframe; a main/sub-scanning unit that includes a main-scanning unit to expose a light-beam onto a sheet-film by scanning the light-beam in a main-scanning direction and a sub-scanning unit to convey the sheet-film in a sub-scanning direction; and a supporting member to mount and support the main/sub-scanning unit onto the mainframe at a supporting position. The height of the supporting position is substantially the same as that of a center of gravity of the main/sub-scanning unit. The sub-scanning unit is detachably integrated with the main-scanning unit to form the main/sub-scanning unit.

10 Claims, 11 Drawing Sheets

FIG. 3 (a)
FIG. 3 (b)
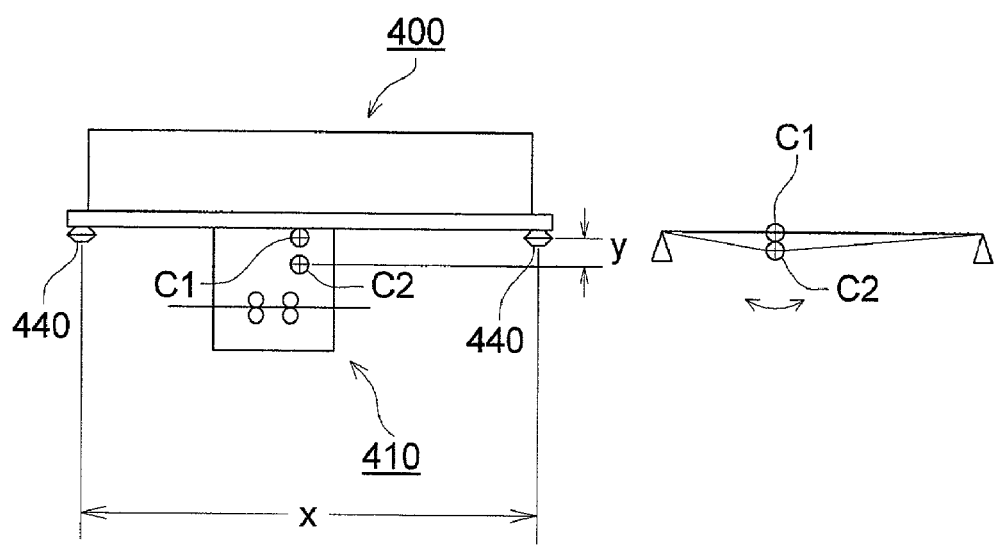
FIG. 4 (a)
FIG. 4 (b)
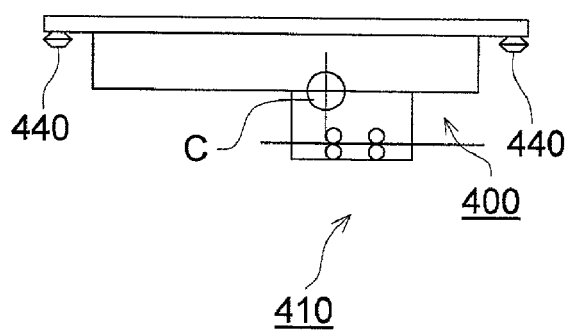

FIG. 5 (a)
FIG. 5 (b)
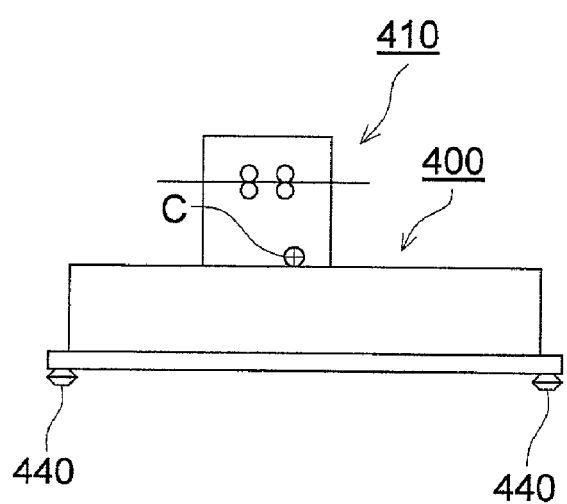
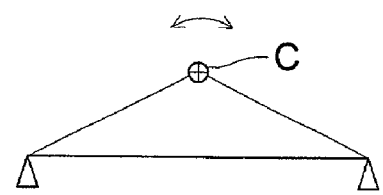

SCANNING UNIT OF IMAGE-RECORDING APPARATUS

BACKGROUND OF THE INVENTION

The present invention relates to an apparatus, which irradiates a light-beam onto a sheet-film.

There has been well-known such a system that records an image onto a sheet-film, comprising a photosensitive material, such as a heat-processable photosensitive material, etc., by scanning a laser beam on the sheet-film under a drive controlling operation based on image data, radiographed by a medical image radiographing apparatus such as the X-ray CT or the MRI, etc., and transmitted to an image-recording apparatus, such as the Laser-Imager, etc.

Further, there has been developed and introduced into medical facilities such an image-recording apparatus that comprises both an image recording section to irradiate a laser beam onto the sheet-film and a processing section to develop the sheet-film.

In the abovementioned image-recording apparatus, a quality of the recorded image considerably depends on a scanning accuracy of a main-scanning unit for scanning the laser beam and a conveyance accuracy of a sub-scanning unit for conveying the sheet-film. Specifically, among the optical-parts comprising the main-scanning unit, a polygon mirror rotating at a high-velocity is sensitive to external vibrations, and is liable to induce unevenness of its rotating velocity. As a result, such the unevenness of rotating velocity of the polygon mirror causes unevenness of the recorded image.

For the purpose of solving the troubles stated above, there is proposed TOKKAISHO No. 61-230465 that discloses an image-recording apparatus having a construction in which an optical system (main-scanning unit) and a conveyance system (sub-scanning unit) are supported by the same supporting plate.

However, when there is employed the construction to support the optical system and the conveyance system with the same supporting plate, mass of the overall unit is increased, a height of the center of gravity of the overall unit is increased, and a position of the center of gravity of the overall unit on which the units are mounted is much higher than a height of a supporting position at which a supporting member supports the overall unit, and thereby, external vibrations cause the unit to make a pendulum-like turn, resulting in a concern of occurrence of the problems such as writing unevenness, etc.

For the problems mentioned above, there is proposed a construction to solve the problems by combining a plurality of vibration isolating members and regulating members in TOKKAIHEI No. 2-271136. However, this construction has not enough to be a satisfactory measure for the problems that external vibrations cause a main/sub-scanning unit to make a pendulum-like turn because a height of the center of gravity of the unit is increased and much higher than a height of supporting position at which a supporting member supports the unit, and has another problem that a space for providing plural supporting members is needed and low frequency vibrations are caused by a large-sized unit.

To suppress low frequency vibrations, there have been made attempts for lightening by dividing a sub-scanning unit and for lightening by thinning a wall thickness of a part and by changing to the resin materials, which are suggested in TOKKAISHO No. 58-17767. However, use of parts lightened excessively sometimes leads to a cost increase, and dispersion of accuracy created by a difference in thermal expansion caused by use of combined different materials is a problem, which cannot be ignored for forming minute images.

In the past, the vibration isolating member has been provided under the optical unit of a writing system, which has caused a height of the center of gravity of the optical unit to be much higher than a height of the vibration isolating member in many cases, and thereby, the optical unit has been caused by vibrations to tend to reciprocate linearly in the vertical, from-side-to-side and diagonal directions, and to make a pendulum-like turn. This pendulum-like turn has a tendency to be generated generally under the low frequency, and its decay time is longer than that of the vibration caused by the linear reciprocating motion.

In particular, in the case of the construction to have a film conveyance mechanism on the lower side of the optical unit, and in the case of the construction to have a film conveyance mechanism on the upper side of the optical unit, the height of the center of gravity of the optical unit grows greater, and the pendulum-like turn grows greater accordingly. To achieve stability of the unit under such construction, it is necessary to broaden intervals for attaching vibration isolating members, which leads to the large-sized apparatus.

Further, the scanning section that is made of various materials and employs a laser beam has resulted in unstable mass balance in many cases, because of the restriction in arrangement of functional parts derived from insurance of an optical path and of unbalance in materials and specific gravity.

Though there is proposed, in TOKKAISHO No. 61-230465, the construction to achieve stability of a unit by arranging respectively an optical unit and a film conveyance mechanism on both upper and lower sides of the same supporting plate, by supporting the supporting plate with a leg member to have an angle, and by supporting the lower portion of the leg member with the vibration isolating member, it is impossible to avoid the pendulum-like turn caused by vibrations because a position of the center of gravity of the optical unit is high and is away from the vibration isolating member located at the lower portion for mounting on the main body. Further, it is difficult, because of the structure of the leg member, to make the optical unit and the film conveyance mechanism to be capable of being mounted and dismounted, thus, maintenance work is still difficult, and it is impossible to avoid that the unit is made to be large in size and its mass increases.

Further, when mass of the unit grows greater, low frequency vibrations of the unit are increased, and it is necessary to use an elastic member such as rubber with low hardness to suppress the low frequency vibrations. Nevertheless, there is generated a shake of the unit caused by the vibrations, which has resulted in a fear of the problem that the unit comes in contact with surrounding members of the conveyance system. Even in the case of transportation of the unit, there have been problems including damages of precision optical parts caused by the excessive shake of the unit and damages caused by the contact between the unit and surrounding members of the conveyance system.

SUMMARY OF THE INVENTION

To overcome the abovementioned drawbacks in conventional image-recording apparatus, it is an object of the present invention to provide an apparatus having a simple structure and providing stable and quality images, which are free from image unevenness caused by vibrations.

Accordingly, to overcome the cited shortcomings, the abovementioned object of the present invention can be attained by apparatus described as follow.

(1) An apparatus, comprising: a mainframe of the apparatus; a main/sub-scanning unit that includes a main-scanning unit to expose a light-beam onto a sheet-film by scanning the light-beam in a main-scanning direction and a sub-scanning unit to convey the sheet-film in a sub-scanning direction; and a supporting member to mount and support the main/sub-scanning unit onto the mainframe at a supporting position; wherein a height of the supporting position is substantially the same as that of a center of gravity of the main/sub-scanning unit.

(2) The apparatus of item 1, wherein the sub-scanning unit is detachably integrated with the main-scanning unit to form the main/sub-scanning unit.

(3) The apparatus of item 1, further comprising: a regulating member to regulate a position of the main/sub-scanning unit; wherein the regulating member is disposed between a bottom plate of the main-scanning unit and the supporting member fixed onto the mainframe.

(4) The apparatus of item 3, wherein the regulating member comprises a vertical shaft and an elastic member provided on an outer circumferential surface of the vertical shaft, and an outer circumferential surface of the elastic member is fitted into a through-hole, formed at the main-scanning unit, with a certain clearance between them.

(5) An apparatus, comprising: a mainframe of the apparatus; a main/sub-scanning unit that includes a main-scanning unit to expose a light-beam onto a sheet-film by scanning the light-beam in a main-scanning direction and a sub-scanning unit to convey the sheet-film in a sub-scanning direction; a supporting member to mount and support the main/sub-scanning unit onto the mainframe at a supporting position; and a regulating member to regulate horizontal movement of the main/sub-scanning unit; wherein the regulating member is disposed between the main-scanning unit and the supporting member fixed onto the mainframe, and a height of the regulating member is substantially the same as that of a center of gravity of the main/sub-scanning unit.

(6) The apparatus of item 5, wherein the sub-scanning unit is detachably integrated with the main-scanning unit to form the main/sub-scanning unit.

(7) The apparatus of item 5, further comprising: a fixing member to fix the main/sub-scanning unit onto the mainframe at the supporting position; wherein an operation for releasing the main/sub-scanning unit from a fixing state is possible.

(8) The apparatus of item 7, wherein the main/sub-scanning unit is fixed onto the mainframe at the supporting position by fixing both the main/sub-scanning unit and the regulating member with the fixing member.

Further, to overcome the abovementioned problems, another image-recording apparatus, embodied in the present invention, will be described as follow:

(9) An image-recording apparatus, characterized in that, in the image-recording apparatus, in which a sheet-film conveyed by a sub-scanning unit is subjected to scanning exposure through a main-scanning unit including a light-beam means, the height for mounting a supporting member with which a main/sub-scanning unit, in which the main-scanning unit and the sub-scanning unit are unified detachably, is mounted on the image-recording apparatus, is set to the position that is equal to or higher than a position of the center of gravity of the main/sub-scanning unit.

BRIEF DESCRIPTION OF THE DRAWINGS

Other objects and advantages of the present invention will become apparent upon reading the following detailed description and upon reference to the drawings in which:

FIG. 3($a$) and FIG. 3($b$) are illustrative diagrams for illustrating the positional relation between a position of the center of gravity and a vibration-isolating member and illustrating how a force is applied in the main/sub-scanning unit related to the invention;

FIG. 4($a$) and FIG. 4($b$) are illustrative diagrams for illustrating the positional relation between a position of the center of gravity and a vibration isolating member and illustrating how a force is applied in the main/sub-scanning unit which is an example of a conventional image-recording apparatus;

FIG. 5($a$) and FIG. 5($b$) are illustrative diagrams for illustrating the positional relation between a position of the center of gravity and a vibration-isolating member and illustrating how a force is applied in the main/sub-scanning unit which is another example of a conventional image-recording apparatus;

DETAILED DESCRIPTION OF THE PREFERRED EMBODIMENT

Figure 1:
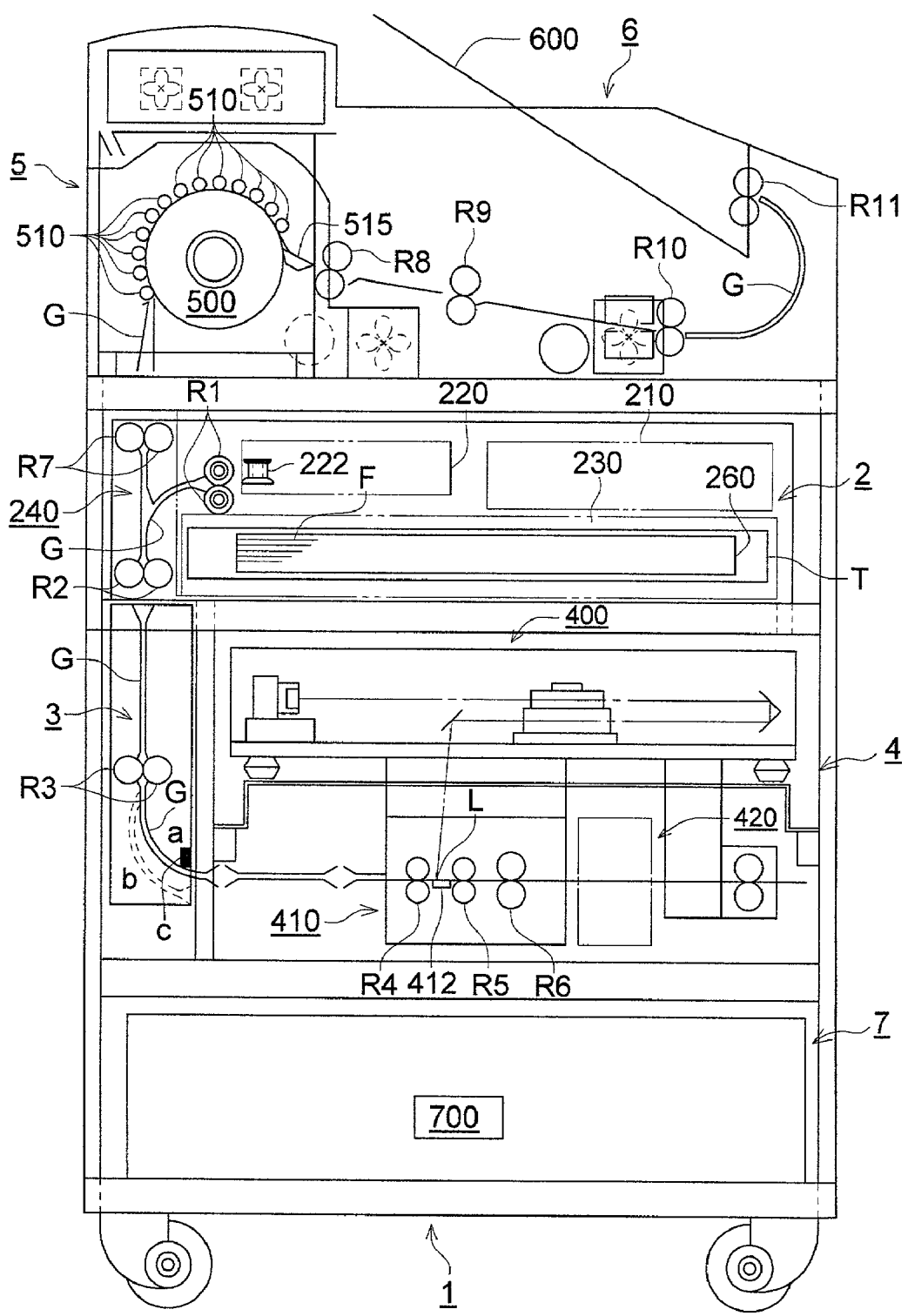
FIG. 1 is an illustrative front view showing the overall structure of the image-recording apparatus composed of a laser imager employing a silver halide thermal development dry process.

FIG. 1 is an illustrative front view showing the overall structure of the image-recording apparatus composed of a laser imager employing silver halide thermal development dry system. Incidentally, the image-recording apparatus shown in FIG. 1 merely indicates one of the most desirable embodiments of the present invention. Although some of the terms in respect to the present invention are decisively explained in the following in order to exemplify the specific embodiment, the scope of the present invention is not limited by the terms defined in the following.

Image-recording apparatus 1 shown in the figure has therein sheet-film supply section (hereinafter referred to simply as a film supply section) 2, film conveyance path 3, recording section 4, thermal developing section 5 provided on the top portion of the main body, film ejection section 6 and electrical equipment including control section 700 provided in the lower portion of the main body.

To be concrete, the film supply section 2 is provided to be unified with tray T which will be described later, and is composed at least of opening and closing mechanism section 210 for opening and closing a cover member (not shown) that keeps accumulation of sheet films (hereinafter referred to simply as a film) F loaded in container 260 on a light-tight basis, pickup mechanism section 220 including film holding means 222 that picks up, through negative pressure attraction, the film F one sheet by one sheet in accordance with recording operations from an opening portion that is formed when the cover member is moved, film loading section 230 including the tray T and of a carry-in and carry-out path 240 equipped with a supply mechanism for unprocessed films and a conveyance mechanism for exposed films.

The carry-in and carry-out path 240 is formed with conveyance roller R1 that feeds out the picked up film F to the film conveyance path 3, conveyance roller R7 that conveys the exposed film F to the thermal developing section 5, conveyance roller R2 that achieves the aforesaid two conveyances by rotating regularly and reversely, and guide means (guide plates) G each being provided between the conveyance rollers.

The aforesaid film holding means 222 in plural quantity are provided on an appropriate holding member at regular intervals.

The aforesaid opening and closing mechanism section 210 for opening and closing the cover member is operated by an unillustrated motor and cam mechanism.

The film loading section 230 can move between the first position pulled out to this side on the sheet surface and the second position pushed into the apparatus main body, and film replacement is conducted at the aforesaid first position.

The tray T has a box-shaped recessed portion, and the film F is placed (loaded) in container 260 whose top portion is open.

The film F before it is loaded is held to be stacked on the container 260, and is covered by the known barrier bag on a light-tight basis, and inside of the barrier bag is kept to be at the pressure of −60 kilo pascal, for example.

With regard to film F loading, the film F is housed in the tray T in the form called the aforesaid film package, and a pinion is rotated by an unillustrated rack to take up a barrier bag to remove it by utilizing a stroke of the tray T when it is pushed in from the first position to the second position, so that the film F loading is completed.

The film conveyance path 3 is positioned under the carry-in and carry-out path 240 and is arranged so that it can convey the film F in the longitudinal direction. The film conveyance path 3 is formed by paired conveyance rollers R3 and by guide plates G which are arranged to be above and below the conveyance rollers R3.

The film conveyance path 3 is structured so that a front portion mounting member and a rear portion mounting member both will be described later can be pulled out this way as a solid unit, and R-shaped conveyance path G positioned under the film conveyance path 3 can be switched from position a for ordinary use to position b for pulling out, for avoiding a frame (having no reference symbol) in the longitudinal direction positioned on this side of the main body on the right side, when the front portion mounting member and the rear portion mounting member are pulled out. Reference symbol c shows a magnet for holding the film conveyance path 3 at the position a for ordinary use. Further, when drawing out the film conveyance path 3, it is necessary to remove a fixing screw (not shown) on this side and to disengage the positioning between a pin (not shown) on the rear side and a hole, first, and then, the film conveyance path 3 is drawn out by avoiding the aforesaid frame by inclining this side downward for avoiding a laterally-stretched frame positioned at the upper portion on this side, which will be explained in detail later.

The recording section 4 stated above is provided under the film supply section 2, and is equipped with a laser light source, a polygon mirror, an Fθ lens and a cylindrical lens which have no reference symbol. The recording section 4 has main-scanning unit 400 that is driven and controlled in accordance with image data after the image processing mentioned earlier and sub-scanning unit 410 provided directly below the main-scanning unit 400, but explanation of the practical structure (arrangement relationship) of the main-scanning unit 400 is omitted here because it is not novel, and a known structure can be used.

Figure 2A:
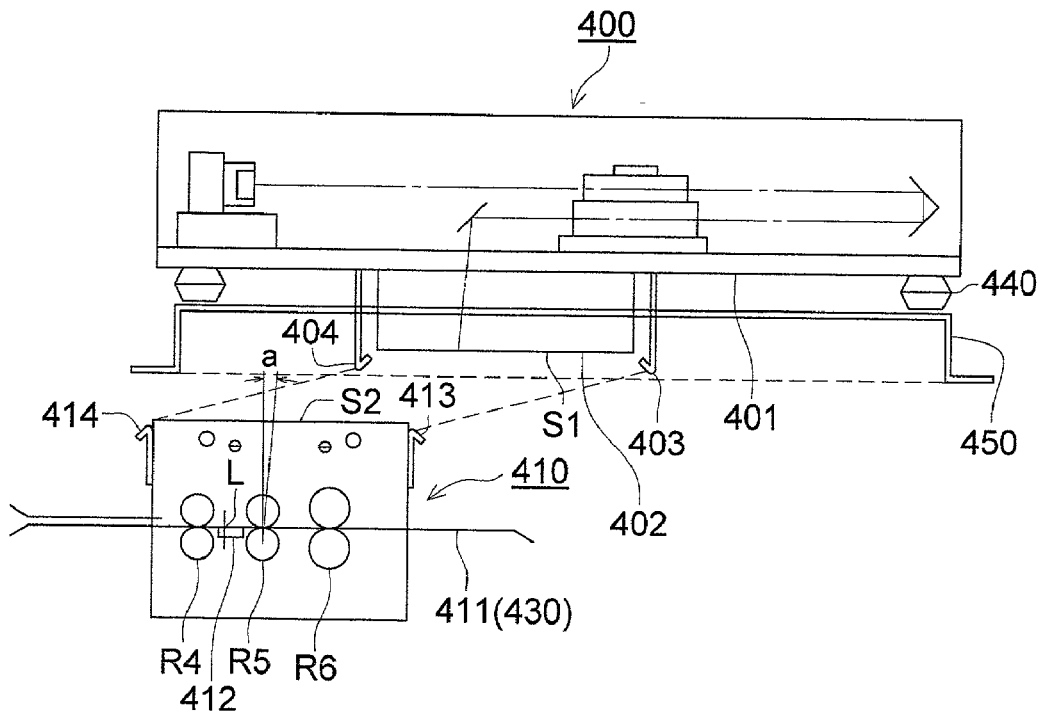
FIG. 2($a$) and FIG. 2($b$) are illustrative sectional views for illustrating how a main-scanning unit and a sub-scanning unit both relating to the invention are mounted and dismounted.
Figure 2B:
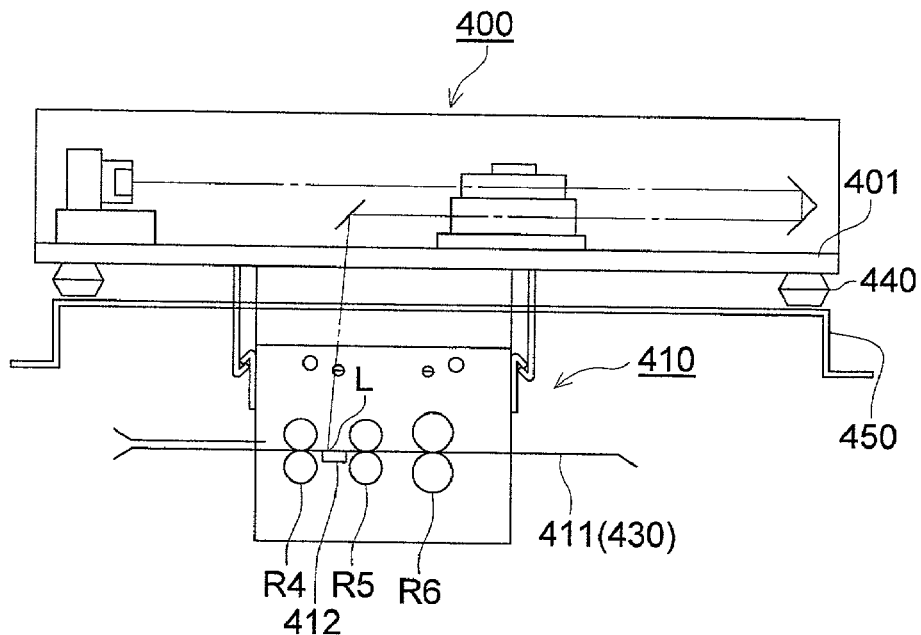

As is apparent from FIG. 2(a) and FIG. 2(b) showing enlarged primary portions of the recording section 4, the sub-scanning unit 410 is provided with sub-scanning conveyance path 411 located on horizontal conveyance path 430, platen 412 that is equally on the horizontal conveyance path 430 and is arranged so that the prescribed surface may agree with laser beam scanning recording position L, two paired conveyance rollers R4 and R5 and paired back rollers R6, and each roller is structured so that it can be driven to rotate regularly and reversely and can be switched, together with an unillustrated solenoid cam mechanism, to be brought into pressure contact and to be released from the pressure contact.

The numeral 420 shown with two-dot chain line on the right side of the sub-scanning unit 410 represents a position regulating section having an unillustrated position regulating member that regulates the conveyed film F so that its one side may agree with a reference position on either one of the left and right sides both are in the direction perpendicular to the film conveyance direction.

The thermal developing section 5 has on its surface a silicone rubber layer, and is provided with drum 500 that is rotatable and has a heating source therein, rotatable pressure roller 510 that is provided to be brought into pressure contact lightly with the surface of the drum 500 and has a small diameter, and with conveyance roller R8. An appropriate number of the pressure rollers 510 are provided in a range from the position for receiving in the film conveyed through the carry-in and carry-out path 240 to the position near the separating means 515 so that film F may be developed uniformly.

The film ejection section 6 includes a cooling and conveying section by which the film subjected to thermal development is conveyed during its spontaneous radiation of heat, and film receiving tray 600 that is formed by utilizing a part of the top surface of the apparatus.

Incidentally, the image-recording apparatus 1 stated above is regarded as a digital radiographic image outputting apparatus when a medical image radiographing apparatus such as X-ray CT is made to be a radiographic image inputting apparatus. For example, the image-recording apparatus 1 is used so that it accepts image data digitized on the radiographic image inputting apparatus side through the network that conforms to DICOM (Digital Imaging and Communications in Medicine) standard relating to network communication of radiographic image data, then, scanning is conducted by a laser beam in accordance with the image data, images are recorded on film F representing a dry silver halide film.

Further, with respect to digitizing of radiographic images, it can be conducted, for example, by CR employing a stimulable phosphor.

The CR mentioned above is a technology wherein X-ray energy transmitted through an object is accumulated in a phosphor and then is scanned by a laser beam, and photo-stimulated luminescence thus generated is converted photoelectrically, thereby digital X-ray signals are obtained.

Incidentally, in the image-recording apparatus 1, various controls including film conveyance control resulted from data receiving from the inputting apparatus side and laser beam scanning control are conducted by control section 700 including a computer.

Operations of the image-recording apparatus having the above-mentioned structure will be explained briefly as follows, including the control which has not been explained in the present column.

Image data transmitted from the inputting apparatus side are temporarily taken in a storage section in control section 700 through an interface.

On the other hand, film F is set at the second position in the apparatus main body, and when an actuator such as a sensor confirms that a temperature on the surface of drum 500 is within a range of the prescribed temperature, an unillustrated cam mechanism in the opening and closing mechanism section 210 is driven by a motor, and an opening having a prescribed width is formed.

Then, a negative pressure pump is operated, and thereby, film holding means 222 is lowered while it is regulated by an unillustrated regulating means to finally touch the uppermost film.

Next, when the film holding means 222 is driven to rise by the regulating means, the uppermost film F is separated from a bundle of stacked films by negative pressure attraction to rise, and its leading edge section is nipped by paired conveyance rollers R1 located at an end of the carry-in and carry-out path 240 on the right side.

To be concrete, when the film holding means 222 is lowered, the conveyance rollers R1 located at the lower portion retreat to the position which does not interfere with a locus of rise of the leading edge of the film, while, the conveyance rollers R1 located at the upper portion are on the locus of rise of the film, thus, the film F separated and conveyed (lifted) under the condition that the film holding means 222 is returned to its initial position comes in contact with the upper conveyance rollers R1.

Then, while the above-mentioned condition is kept, the lower conveyance rollers R1 are returned to its original position to complete nipping of the film F, and almost simultaneously, operations of the negative pressure pump are stopped, and an electromagnetic valve (not shown) is released, and thereby, the attraction of the film holding means 222 to the film F is released.

The film F nipped by the conveyance rollers R1 is conveyed downward by other conveyance rollers R2 and R3 through the conveyance path 3, then, is conveyed horizontally through the film horizontal conveyance path 430 to enter sub-scanning unit 410.

At the moment when the leading edge of the film F enters the sub-scanning unit 410, pressure contact of conveyance rollers R4 and R5 is released, while, back roller R6 is in pressure contact and its rotation is stopped. Therefore, the leading edge of the film F passes through conveyance rollers R4 and R5 and hits the pressure contact section of the back roller R6 to be corrected in terms of inclination, and stops.

After that, the back roller R6 starts rotating, and the film F is conveyed to the position regulating section 420, and is regulated in terms of position (position correction) by an unillustrated position regulating member in synchronization with temporary cancellation of pressure contact of the back roller R6, and it stops simultaneously with stopping of rotation of the back roller R6. In this case, the trailing edge of the film F is in the state of being nipped by the back roller R6 after passing through the conveyance rollers R4 and R5, and at this point of time, the conveyance roller R5 results in the state of pressure contact.

Then, the back roller R6 starts rotating reversely, and the film F is conveyed with its trailing edge taking the lead, and is nipped by the conveyance rollers R5 which have started rotating reversely equally to be conveyed (hereinafter, the current leading edge is called the trailing edge from now on, and the trailing edge is called the leading edge, because its advancing direction is changed).

Image data are read from a storage section in the control section 700, synchronizing with the moment when the position to start writing at the leading edge of the film F arrives at laser beam scanning recording position L that is located between conveyance rollers R4 and R5, and the laser beam is made to scan (main-scanning). During this period, conveyance velocity for film conveyance (sub-scanning) is kept at a high precision for securing the image accuracy.

Paired conveyance rollers R5 have a swinging angle which will be explained later, and they press the film F against platen 412 when the rollers are in pressure contact.

Then, when the leading edge of the film F passes through the point of conveyance roller R4 which has started rotating reversely, the conveyance roller R4 also comes in pressure contact simultaneously.

Scanning exposure (latent image forming) is advanced, and pressure contact of back roller R6 is released before the trailing edge of the film F passes through the back roller R6.

Further, the film F is conveyed, and pressure contact of conveyance roller R5 is released before the trailing edge passes through the conveyance roller R5.

Before the trailing edge of the film F passes through the back roller R6 and conveyance roller R5, the pressure contact of the roller is released as stated above, and thereby, the shock in the course of passing is avoided.

The film F on which the scanning exposure (latent image forming) has been completed is conveyed by conveyance roller R3 of film conveyance path 3 and by conveyance roller R2 (reverse rotation) and conveyance roller R7 of the carry-in and carry-out path 240, and is conveyed in the thermal development section 5. The film F is brought into pressure contact with the surface of drum 500 in the thermal development section 5 through pressure roller 510, and thereby, visible images which are close to latent images accurately are formed in succession.

The film F separated from the drum 500 by the separating means 515 is conveyed through conveyance rollers R8, R9 and R10 to be cooled through spontaneous radiation of heat, and is ejected onto film receiving tray 600 by conveyance roller R11.

FIG. 2 is an illustrative sectional view for illustrating mounting and dismounting of the main-scanning unit and the sub-scanning unit related to the invention. FIG. 2(a) is an illustrative diagram showing the state wherein the sub-scanning unit 410 is not mounted on the main-scanning unit 400, while, FIG. 2(b) is an illustrative diagram showing the state wherein the sub-scanning unit 410 is mounted on the main-scanning unit 400.

In FIG. 2(a), the main-scanning unit 400 has therein bottom plate 401 of the main-scanning unit housing therein primary parts of the optical system such as a laser light source, a polygon mirror, an Fθ lens, sub-scanning unit mounting section 402 where the sub-scanning unit 410 can be mounted on or dismounted from, first guide members 403 and 404 which can make sub-scanning unit 410 including a second guide member (described later) to slide detachably while holding sub-scanning unit 410 including a second guide member (described later), a first positioning member (described later) for positioning the sub-scanning unit 410 when it is mounted to keep the relative positional relationship, a plurality of vibration isolating members 440 which are mounted on the bottom plate 401 and are made of silicone rubber, and main scanning unit mounting member 450 for mounting on the main-scanning unit 400 through the vibration isolating members 440.

In the present example, the main-scanning unit 400 which is united with the vibration isolating member 440 and main scanning unit mounting member 450 can be mounted on and dismounted from the image-recording apparatus main body under the condition that the sub-scanning unit 410 mounted detachably on the main-scanning unit 400 is drawn out and removed. As is apparent from the drawing, the main-scanning unit 400 taken out under the condition state above can be placed on a floor horizontally, because the bottom surface of the main scanning unit mounting member 450 is positioned to be lower than lower surface S1 of the sub-scanning unit mounting section 402 and lower surfaces of the first guide members 403 and 404.

Each of the first guide members 403 and 404 attached on bottom plate 401 of the main-scanning unit and of the second guide members 413 and 414 attached respectively on both sides of the outer frame of the sub-scanning unit 410 is one having a simple shape that is formed by folding, for example, a stainless steel plate or a brass plate to 45 degrees through sheet metal processing.

The sub-scanning unit 410 is fixed in terms of its position when the back surface of the second positioning member rear plate described later which forms an end face on the inner part of the sub-scanning unit 410 is brought into contact with the inner side of the protruded portion (hereinafter referred to as a protruded portion of the sub-scanning unit mounting section 402) that is on the inner part of the sub-scanning unit mounting section 402 which forms a lower portion of the main-scanning unit 400 and extends downward from the lower surface S1, when the hooking portions of the second guide members 413 and 414 are engaged with hooking portions of the first guide members 403 and 404 to slide.

Since each of the hooking portions of the first guide members 403 and 404 and of the second guide members 413 and 414 makes an acute angle, when the sub-scanning unit 410 is made to slide, it does not come off on the half way, and it hardly happens that slight metal powder generated by sliding between both metal guide members spills out of the guide members.

Further, there is provided a clearance between the bottom surface S1 of the sub-scanning unit mounting section 402 and the top surface S2 of the sub-scanning unit 410 so that they slide smoothly when the sub-scanning unit 410 is advanced to the position where it hits the protruded portion of the sub-scanning unit mounting section 402.

When the sub-scanning unit 410 arrives at the position where the sub-scanning unit 410 comes in contact with the protruded portion, it is possible to make the bottom surface S1 of the sub-scanning unit mounting section 402 to come in contact with the top surface S2 of the sub-scanning unit 410, by operating a positioning member described later, thus, positions of the main-scanning unit 400 and the sub-scanning unit 410 in the course of laser beam scanning are fixed.

Incidentally, conveyance rollers R5 that constitute the sub-scanning unit 410 have a swinging angle of α, and the upper roller is arranged to be closer to the conveyance roller R4, and when the conveyance rollers R4 and R5 come in pressure contact with the film F to nip it, they press the film against the platen side to prevent shaking of the film at the laser beam scanning recording position L in laser beam scanning.

FIG. 3(a) and FIG. 3(b) are illustrative diagrams for illustrating positional relationship between a position of the center of gravity and a vibration isolating member and for illustrating how a force is applied for the main/sub-scanning unit wherein a main-scanning unit and a sub-scanning unit are unified solidly.

FIG. 3(a) is an illustrative front view for illustrating positional relationship between a position of the center of gravity of the main/sub-scanning unit and a vibration isolating member, and FIG. 3(b) is an illustrative diagram for illustrating how the force is applied at a position of the center of gravity and of a vibration isolating member.

In the diagram, vibration isolating member 440 serves as a supporting member that mounts the main/sub-scanning unit on the image-recording apparatus main body, and C1 represents a position of the center of gravity when the position (height) of the center of gravity of the main/sub-scanning unit is on substantially the same horizontal plane for the position (height) of the vibration isolating member 440, while, C2 represents a position of the center of gravity when the position of the center of gravity of the main/sub-scanning unit is lower than the position of the vibration isolating member 440.

When a position of the center of gravity of the main/sub-scanning unit is mostly on the same plane for the position of the vibration isolating member 440 (when a position of the center of gravity is at C1), a motion to rotate the main/sub-scanning unit is not caused even when vibrations in the direction from side to side are given from the outside, but, when a position of the center of gravity of the main/sub-scanning unit is lower than the position of the vibration isolating member 440 (when a position of the center of gravity is at C2), a rotary motion is caused for vibrations from the outside if the value of the position C2 of the center of gravity is too large, and image unevenness tends to be caused, which is a problem. In particular, when a position of the center of gravity of the main/sub-scanning unit is away farther from the horizontal plane on which the vibration isolating member 440 for mounting the main/sub-scanning unit on the image-recording apparatus main body is mounted, decay time for the aforesaid rotary motion is longer.

In the present example, when x represented a distance between vibration isolating members 440 at left and right (sub-scanning direction), of cause, this means the distance of the sub-scanning direction of two support positions most distant in the sub-scanning direction, y represented a distance between a position of the vibration isolating member 440 and a position of the center of gravity of the main/sub-scanning unit, and ratio x/y represented a value at which position C2 of the center of gravity does not cause the rotary motion, excellent results were obtained under the conditions of x=470 mm, y=30 mm and y/x=1/16.

An allowable range is a range of y/x<1/10 and a value that is further preferable is in a range of y/x<1/20.

When z represented the distance of the main-scanning direction of two support positions most distant in the main-scanning direction, y represented the distance of the height direction between the position of the supporting position at which a supporting member support the main/sub-scanning unit and the center of gravity of the main/sub-scanning unit as well as above y, a preferable range is a range of y/z<1/10, and a further preferable range is a range of y/z<1/20.

FIG. 4(a) and FIG. 4(b) are illustrative diagrams for illustrating the positional relationship between a position of the center of gravity and a vibration isolating member and for illustrating how the force is applied for the main/sub-scanning unit wherein the main-scanning unit and the sub-scanning unit are united solidly which is an example of the conventional image-recording apparatus.

FIG. 4(a) is an illustrative front view for illustrating the positional relationship between a position of the center of gravity and a vibration isolating member for the main/sub-scanning unit, and FIG. 4(b) is an illustrative diagram for illustrating how the force is applied at the position of the center of gravity and the position of the vibration isolating member.

In the diagram, the position of vibration isolating member 440 is arranged to be higher than that of center of gravity C of the main/sub-scanning unit, and its value exceeds values in the aforesaid allowable range. Therefore, if vibrations are given in the direction from side to side from the outside, a movement of the whole main/sub-scanning unit to swing like a pendulum is generated. This rotary movement becomes greater as the position of the center of gravity C of the main/sub-scanning unit is away from the position of the vibration isolating member 440 further, and its decay time becomes longer.

FIG. 5(a) and FIG. 5(b) are illustrative diagrams for illustrating the positional relationship between the position of the center of gravity and the vibration isolating member, and how the force is applied for the main/sub-scanning unit wherein the main-scanning unit and the sub-scanning unit are united integrally, that is another example of the conventional image-recording apparatus.

FIG. 5(a) is an illustrative front view for illustrating the positional relationship between the position of the center of gravity and the vibration isolating member of the main/sub-scanning unit, and FIG. 5(b) is an illustrative diagram for illustrating how the force is applied at positions for the center of gravity and the vibration isolating member.

In the diagrams, the height of the vibration isolating member 440 for the main/sub-scanning unit is arranged to be lower than the position of the center of gravity C of the main/sub-scanning unit. Therefore, if vibrations are given in the direction from side to side from the outside, a movement of the whole main/sub-scanning unit to swing like a pendulum is generated. This rotary movement becomes greater as the position of the center of gravity C of the main/sub-scanning unit is away from the position of the vibration isolating member 440 further, and its decay time becomes longer.

Incidentally, with respect to the position of the vibration isolating member 440, there has been explained only about the vertical direction. In the horizontal direction, a well-balanced vibration isolating effect can be obtained, by arranging a plurality of vibration isolating members on the circumference of a circle that is formed on a plane and has its center on the position of the center of gravity of the main/sub-scanning unit. Further, positions of the vibration isolating members in the horizontal direction may either be four points on the aforesaid circumference each being the intersection of each of the two straight lines passing through the center of the circle and the circle, or be optional plural positions on the circumference each being the intersection of each of three or more straight lines and the circle.

Figure 6:
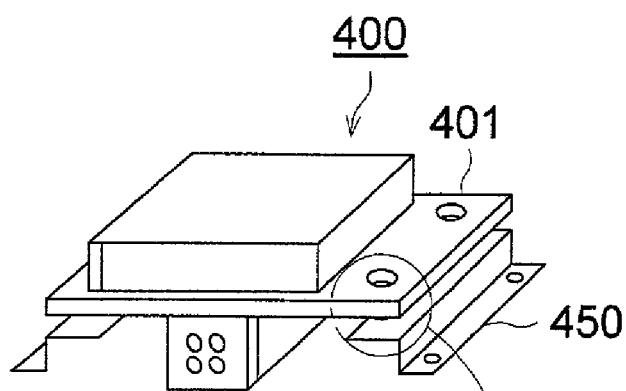
FIG. 6($a$) and FIG. 6($b$) are perspective views for illustrating the structure of a regulating member that is provided between a bottom plate of the main-scanning unit and a mounting plate for the main-scanning unit both related to the invention.
Figure 6:
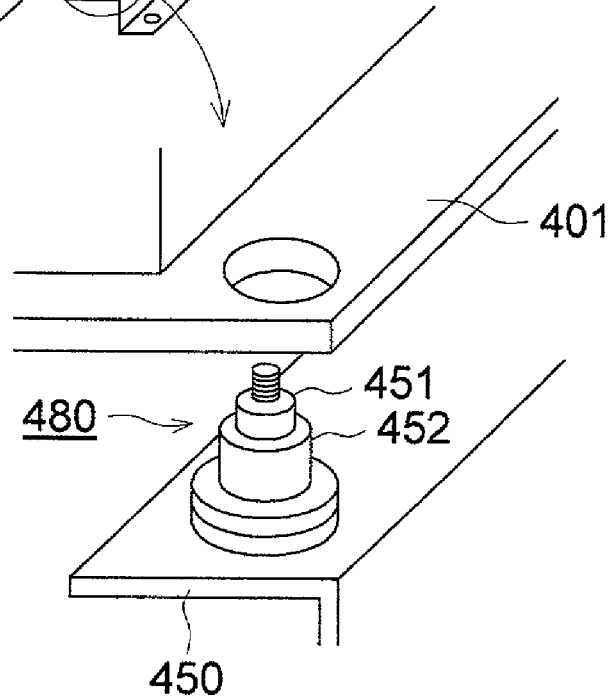
Figure 7:
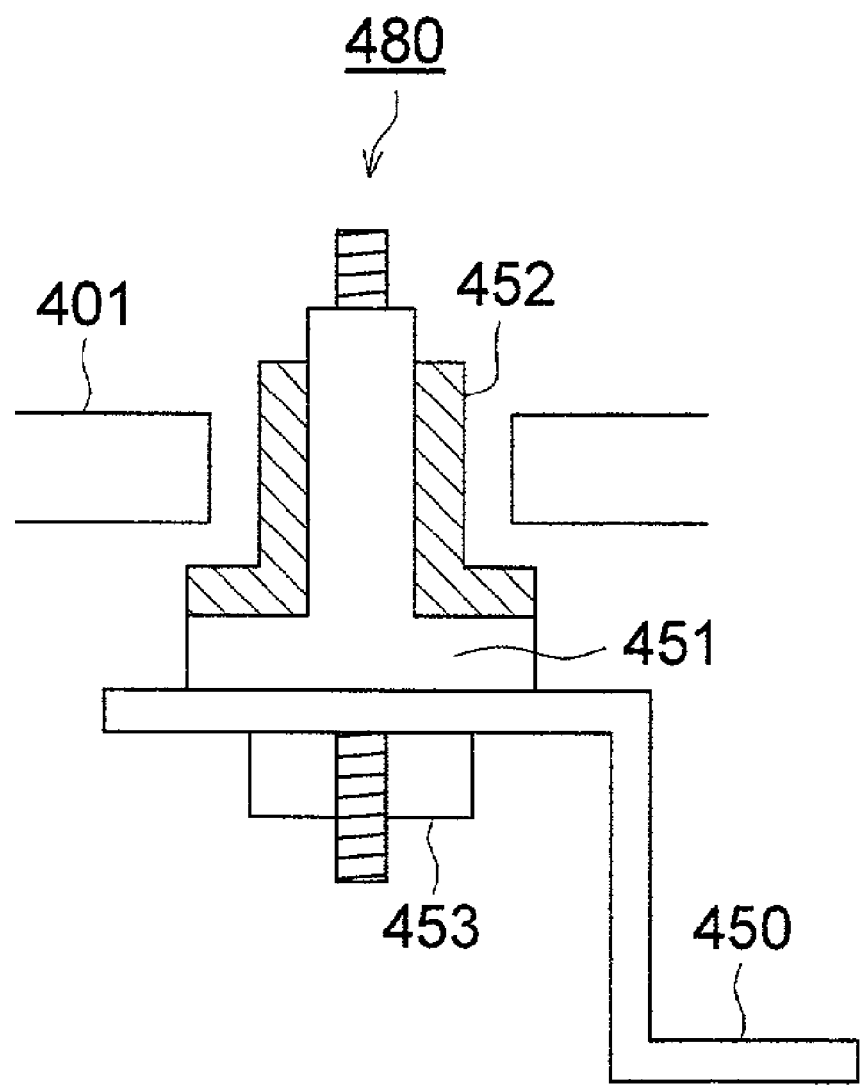
FIG. 7 is a sectional view for illustrating the structure of a regulating member that is provided between a bottom plate of the main-scanning unit and a mounting plate for the main-scanning unit both related to the invention.

FIG. 6(a) and FIG. 2(b) are perspective views for illustrating the structure of a regulating member provided between a bottom plate of the main-scanning unit and a main-scanning unit mounting plate, relating to the invention, FIG. 6(a) is a perspective view showing the location where the regulating member is attached, FIG. 6(b) is a partially-enlarged diagram, and FIG. 7 is a sectional view for illustrating the structure of the regulating member.

In the diagrams, regulating member representing the regulating means on one side (hereinafter referred to as regulating member) 480 is composed of axial regulating member core metal 451 and elastic member 452, and the regulating member core metal 451 is fixed to main-scanning unit mounting section 450 with nut 453, and the elastic member 452 is fit closely with an outer circumferential surface of the axial regulating core metal 451. A round hole having a clearance of 1 mm on its one side representing a regulating means on the other side, for example, is provided at the position corresponding to the axial regulating core metal 451 on the bottom plate 401 of the main-scanning unit 400, thereby, even when the main-scanning unit is vibrated by external vibrations, the elastic member 452 comes in contact with the bottom plate 401 to regulate a width of a lateral shake so that both end portions at right and left of sub-scanning conveyance path 411 structured to be solid may not touch guide plate G and unillustrated conveyance members of position regulating section 420, thus, the conveyance members are not touched in this structure.

Figure 8:
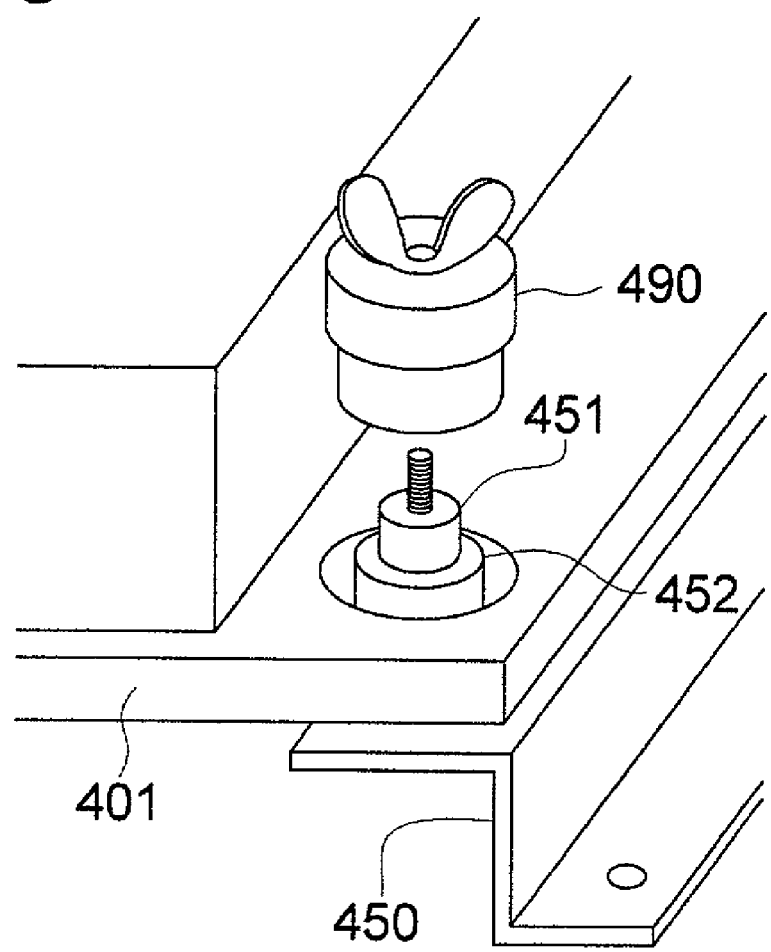
FIG. 8 is a perspective view for illustrating another regulating means that is used when the image-recording apparatus is moved or when transported by a vehicle, etc.
Figure 9:
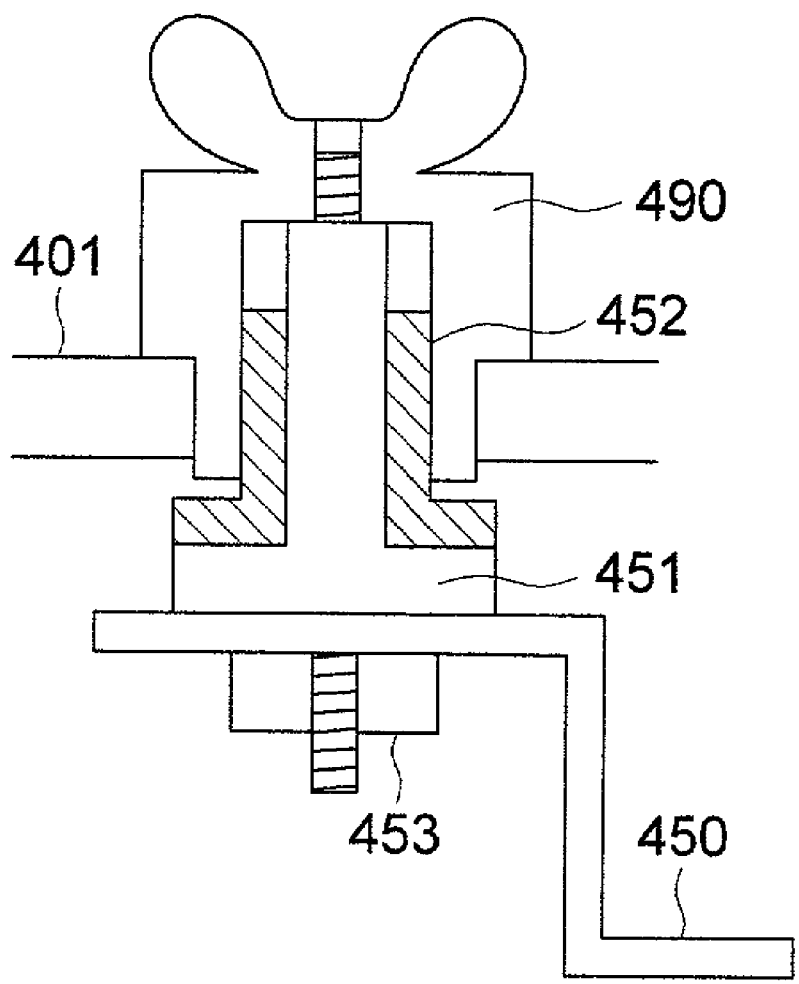
FIG. 9 is a sectional view for illustrating another regulating means that is used when the image-recording apparatus is moved or when transported by a vehicle, etc.

FIG. 8 is a perspective view for illustrating another regulating means that is used when an image-recording apparatus is moved or when it is used on a vehicle. FIG. 9 is a sectional view.

In the drawing, the numeral 490 is a vibration regulating member representing an example of another regulating means composed of resin or metal molded article (hereinafter referred to simply as a vibration regulating member), and the vibration regulating member 490 has therein a female screw that engages with a screw section of the regulating member core metal 451 at the center, an outer diameter section that fits closely in a round hole on the bottom plate 401, an inner diameter section that fits closely in an outer diameter section of the elastic member 452 and a wing nut section for tightening a screw. When transporting or moving an image-recording apparatus of the invention, it is possible to prevent excessive vibrations of the main-scanning unit 400 and to prevent damages of internal precision optical parts.

The invention has made it possible to provide a simply-structured image-recording apparatus for images which are free from image unevenness caused by vibrations and are of stable and high image quality.

Among those used in a hospital practically, an apparatus itself is sometimes moved temporarily or permanently because of an introduction of a novel apparatus or of cleaning of a floor. In these cases, in the case of the apparatus designed under the assumption that it is used without being moved after it is installed, there sometimes is an occasion wherein external force that is greater than expected is applied on the unit supported by an elastic member such as a writing system, thus, a clash is caused on the surrounding conveyance system and a position regulating unit, and thereby, the apparatus suffers fatal damages. To prevent these damages, there have been provided regulating members for the unit to deal with troubles, for regulating the movable range for the unit that is more than necessary. However, it is possible to deal with the aforesaid problems with an extremely simple structure, by using the structure of the position of the center of gravity in the invention.

Figure 10A:
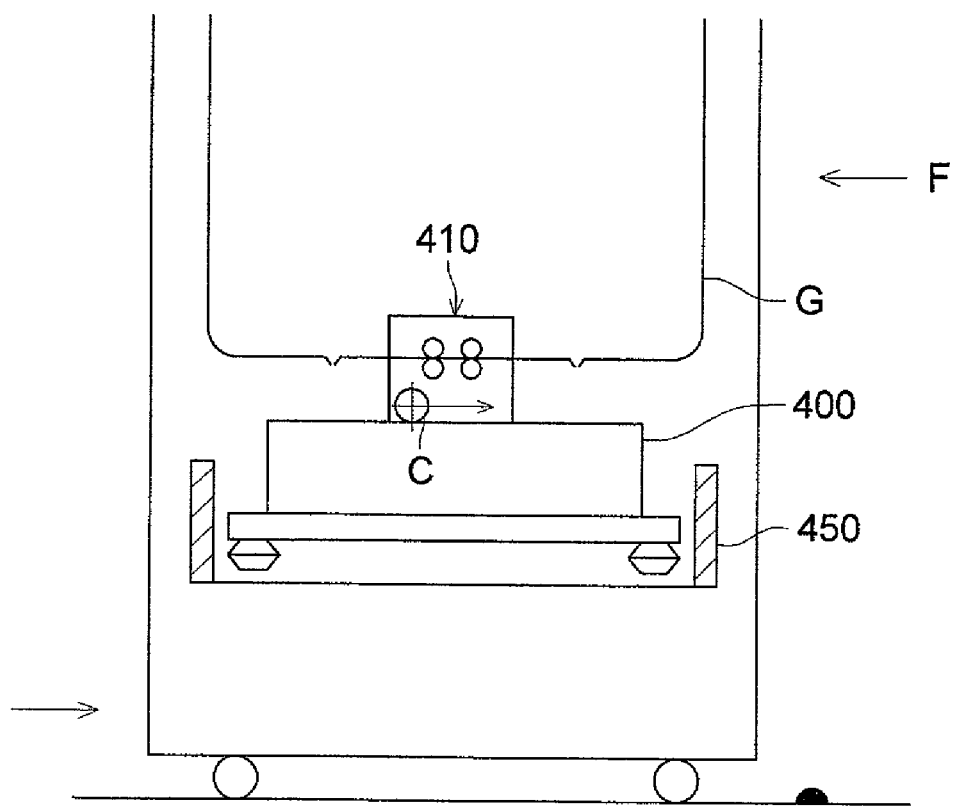
FIG. 10($a$), FIG. 10($b$) and FIG. 10($c$) are explanatory sectional views of an image-recording apparatus, when the external force larger than expected is applied to the image-recording apparatus.
Figure 10:
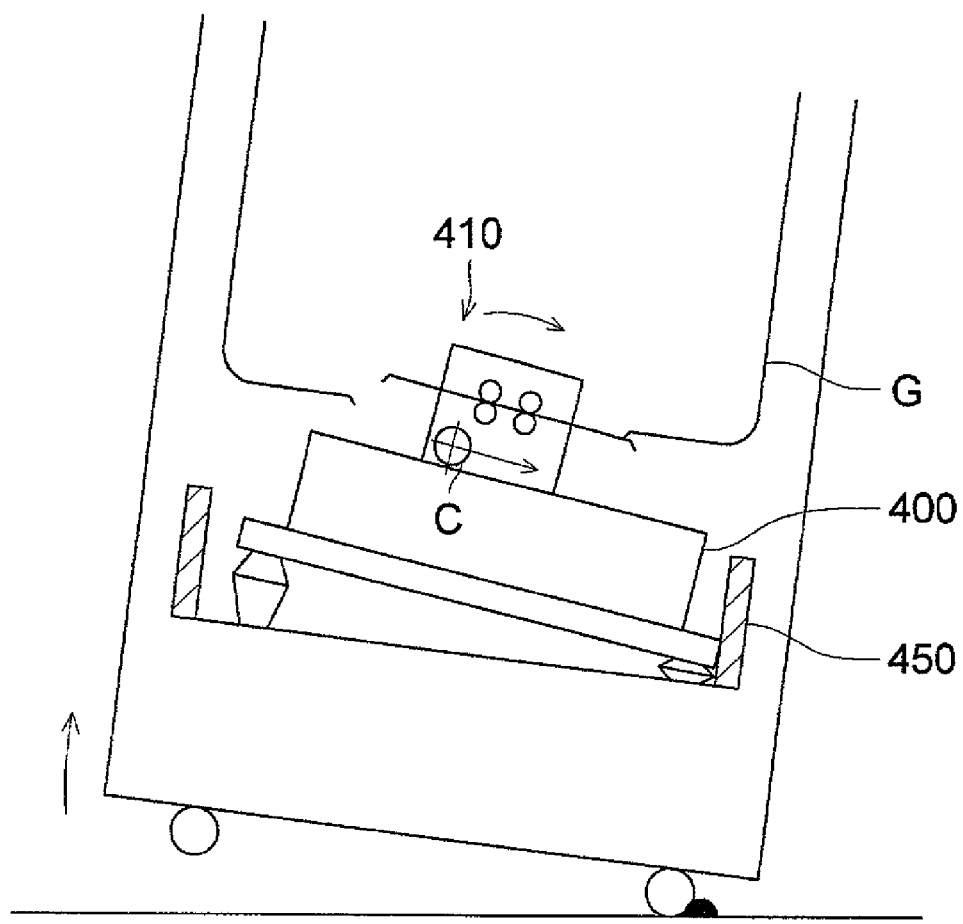
Figure 10:
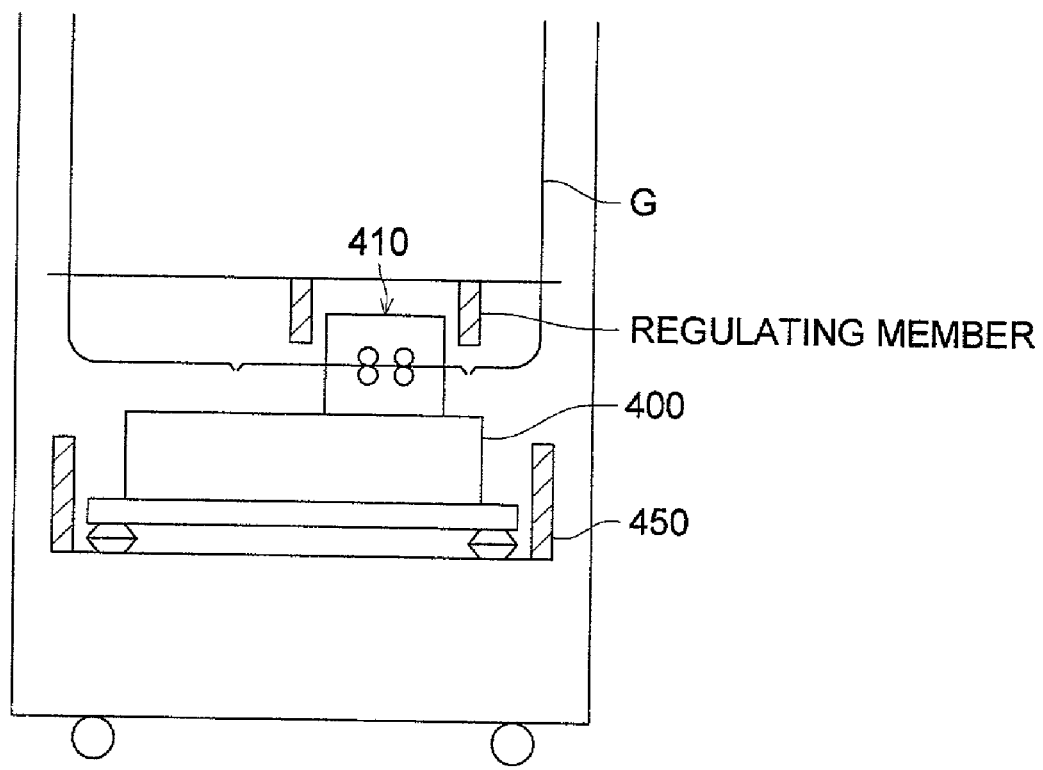

The clash stated above is one caused by a shake of the unit resulted from couple of forces (potential energy) of the writing system unit, for the impact of the apparatus main body. In the case of conventional structure (the examples in FIGS. 4 and 5), the position of the center of gravity tends to shake in the direction opposite to the direction of the impact of the apparatus. However, a certain level of fixing force of the vibration isolating members attached makes the unit to start rotating further (refer to FIG. 10(a) and FIG. 10(b)) after a shaking in the opposite direction to a certain extent. This rotation is greater when a value of y/x is greater, and an amount of shaking of the unit is greater relatively when the unit is of a longwise type. This powerful and great movement causes interference with the surrounding unit and others, which makes damages of the apparatus to be fatal. To avoid this, it has been necessary to provide regulating members further on the end portion of the unit (refer to FIG. 10(c)).

In the present example, the rotation after the aforesaid shaking is extremely slight because the position of the center of gravity and the supporting member are mostly on the same horizontal level. Further, it is possible to suppress an amount of the shaking to be minimum by the structure of the regulating members explained in FIGS. 6 and 7. Further, the whole unit is mostly in the same weight for the height of the supporting section, and a difference between a high portion and a low portion is small, and therefore, the shaking mentioned above and intensity and a size of the rotation can be made minimum, and regulating members to be provided on the end portion of the unit have become unnecessary. Regulating member 490 explained in FIGS. 8 and 9 has a simple structure which makes any person to mount or dismount easily and that parts can be supplied at extremely low cost, therefore, burden of preparation in the user where the apparatus is installed and the apparatus is moved frequently can be lightened. Further, together with a structural arrangement for the vibration isolating member as aforementioned, temporary mounting of this regulating member can protect the apparatus perfectly even for the impact caused not only by horizontal movement by also by rotation of the apparatus.

Disclosed embodiment can be varied by a skilled person without departing from the spirit and scope of the invention.

What is claimed is:

1. An apparatus for recording an image on a film sheet, comprising:
    a mainframe of said apparatus;
    a main/sub-scanning unit that includes a main-scanning unit having a base member and a scanning member fixed onto one side of said base member to expose a light-beam onto said sheet-film by scanning said light-beam in a main-scanning direction, and a sub-scanning unit fixed onto another side of said base member to convey said sheet-film in a sub-scanning direction; and
    a supporting member to mount and support said main/sub-scanning unit onto said mainframe at a supporting position;
    wherein a height of said supporting position is substantially the same as that of a center of gravity of said main/sub-scanning unit.

2. The apparatus of claim 1,
    wherein said sub-scanning unit is detachably integrated with said main-scanning unit to form said main/sub-scanning unit.

3. The apparatus of claim 1, further comprising:
    a regulating member to regulate a position of said main/sub-scanning unit;
    wherein said regulating member is disposed between a bottom plate of said main-scanning unit and said supporting member fixed onto said mainframe.

4. The apparatus of claim 3,
    wherein said regulating member comprises a vertical shaft and an elastic member provided on an outer circumferential surface of said vertical shaft, and an outer circumferential surface of said elastic member is fitted into a through-hole, formed at said main-scanning unit, with a certain clearance between them.

5. The apparatus of claim 1,
    wherein said main/sub-scanning unit is drawable in a direction parallel to said main-scanning direction.

6. An apparatus for recording an image on a film sheet, comprising:
    a mainframe of said apparatus;
    a main/sub-scanning unit that includes a main-scanning unit having a base member and a scanning member fixed onto one side of said base member to expose a light-beam onto said sheet-film by scanning said light-beam in a main-scanning direction, and a sub-scanning unit fixed onto another side of said base member to convey said sheet-film in a sub-scanning direction;
    a supporting member to mount and support said main/sub-scanning unit onto said mainframe at a supporting position; and
    a regulating member to regulate horizontal movement of said main/sub-scanning unit;
    wherein said regulating member is disposed between said main-scanning unit and said supporting member fixed onto said mainframe, and a height of said regulating member is substantially the same as that of a center of gravity of said main/sub-scanning unit.

7. The apparatus of claim 6,
    wherein said sub-scanning unit is detachably integrated with said main-scanning unit to form said main/sub-scanning unit.

8. The apparatus of claim 6, further comprising:
    a fixing member to fix said main/sub-scanning unit onto said mainframe at said supporting position;
    wherein an operation for releasing said main/sub-scanning unit from a fixing state is possible.

9. The apparatus of claim 8,
    wherein said main/sub-scanning unit is fixed onto said mainframe at said supporting position by fixing both said main/sub-scanning unit and said regulating member with said fixing member.

10. The apparatus of claim 5,
    wherein said main/sub-scanning unit is drawable in a direction parallel to said main-scanning direction.

* * * * *